(12) United States Patent
Wang et al.

(10) Patent No.: US 6,274,992 B1
(45) Date of Patent: Aug. 14, 2001

(54) BRAKING METHOD FOR A SINGLE-PHASE MOTOR

(75) Inventors: King Yin Wang, Kaohsiung Hsien; Li-Te Kuo, Pu-Li Chen; Yao-Yu Lee, Chilung; Ming-Jiou Yu, Taipei; Der-Ray Huaug, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/642,547

(22) Filed: Aug. 17, 2000

(30) Foreign Application Priority Data

Jul. 11, 2000 (TW) .................................................. 89113736

(51) Int. Cl.⁷ ................................ H02P 3/00; H02P 5/04; H02K 19/04; H02K 23/68
(52) U.S. Cl. .......................... 318/362; 318/254; 318/439; 318/721; 318/369
(58) Field of Search .................................... 318/138, 254, 318/439, 720–722, 362, 364, 366, 369, 375, 762

(56) References Cited

U.S. PATENT DOCUMENTS

| | | | |
|---|---|---|---|
| 3,708,734 | * 1/1973 | Rowe | 318/762 |
| 4,678,972 | * 7/1987 | Lehnhoff et al. | 318/254 |
| 5,229,693 | * 7/1993 | Futami et al. | 318/254 |
| 6,020,700 | * 2/2000 | Tien | 318/254 |

* cited by examiner

Primary Examiner—Marlon T. Fletcher
(74) Attorney, Agent, or Firm—W. Wayne Liauh

(57) ABSTRACT

The specification discloses a braking method for a single-phase motor, which is applied to a single-phase DC brushless motor driven by a three-phase motor driving IC. The invention uses a control unit to compute the rotational speed of the single-phase motor according to a rotation number signal generated by the motor rotational axis. When the rotational speed is below a threshold, the motor driving IC is controlled to stop rotating the single-phase motor. Through the single-phase motor braking method disclosed herein, the problem of unable to determine the rotational direction of a single-phase motor within a three-phase motor driving IC existing in the prior art can be solved by merely modifying the program in the control unit without adding system elements. Since currently the single-phase DC brushless motor and the three-phase motor driving IC have competitive superiority in prices, if the three-phase motor driving IC can directly drive the single-phase DC brushless motor without requiring additional system elements the whole system cost can be lower. On the other hand, this method can avoid the delay problem due to fewer single-phase motor driving IC manufacturers on the market.

19 Claims, 3 Drawing Sheets

BRAKING METHOD FOR A SINGLE-PHASE MOTOR

BACKGROUND OF THE INVENTION

1. Field of Invention

The present invention relates to a braking method for a single-phase motor and, in particular, to a braking method using a three-phase motor driving IC to drive a single-phase DC brushless motor.

2. Related Art

DC servomotors have superior stability and the relation between the input and output is almost linear, which renders a good controllability; they are therefore widely used in places that require high precision controls. However, the conventional DC motor has a brush and redirector that are subject to erosion. This defect makes the reliability and maintenance of the conventional DC motor worse than other motors. The brushless motor is to replace the rectifier (brush and redirector) of the conventional DC motor with an electronic means so that it is free from the erosion of the brush and redirector and maintenance. Because there is no brush in the structure, it will not generate mechanical and electronic noises in principle. Therefore, such motors have superior properties.

According to the wiring method on the stator, the DC brushless motor can be classified into single-phase type, double-phase ones, three-phase types, five-phase ones, etc. In particular, the three-phase DC brushless motors are more common. Compared with the three-phase DC brushless motor, the single-phase DC brushless motor has the advantages of easy assembly and high yield. Therefore, taking into account the production cost, the single-phase DC brushless motors are more competitive than the three-phase DC brushless motors. Since three-phase motor driving means is still the main stream on the current market and the single-phase motor driving IC is still under development, thus the three-phase motor driving IC has the advantages of mass production and low prices in the motor driving IC industry. If the three-phase motor driving IC can be used to drive the single-phase DC brushless motor, advantages of both of them can be combined to have more competitive power. The time schedule delay in production development due to fewer single-phase motor driving IC manufacturers can be avoided.

Currently, the Opto-Electronics & Systems Laboratories in Industrial Technology Research Institute has successfully applied three-phase motor driving ICs to drive single-phase DC brushless motor. However, the method disturbs the determination of the rotation direction of the main axis motor in the three-phase motor driving IC and results in reverse rotation when the motor braking action stops.

SUMMARY OF THE INVENTION

In view of the foregoing problem of reverse rotation when using a three-phase motor driving IC to drive a single-phase DC brushless motor, it is then a primary object of the invention to provide a braking method for a single-phase motor, which is applied to detect the rotational speed of a single-phase DC brushless motor driven by a three-phase motor driving IC and stop the motor rotation before the motor reverses its rotation.

To achieve the above object, the disclosed braking method for a single-phase motor comprises the steps of: obtaining the magnetic pole position of the single-phase motor rotor; driving the single-phase motor to rotate at the speed set by a user using a motor driving unit according to the rotor magnetic pole position; obtaining a rotation number signal; computing the rotational speed of the single-phase motor according to the rotation number signal using a control unit; stopping the operation of the single-phase motor using the control unit when the rotational speed of the single-phase motor is lower than a threshold.

The braking method for a single-phase motor disclosed herein does not need extra system elements. BY simply modifying the program in the control unit, the problem of unable to determine the rotational direction of a single-phase motor within a three-phase motor driving IC existing in the prior art can be solved. Since currently the single-phase DC brushless motor and the three-phase motor driving IC have competitive superiority in prices, if the three-phase motor driving IC can directly drive the single-phase DC brushless motor without requiring additional system elements the whole system cost can be lower. On the other hand, this method can avoid the delay problem due to fewer single-phase motor driving IC manufacturers on the market.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
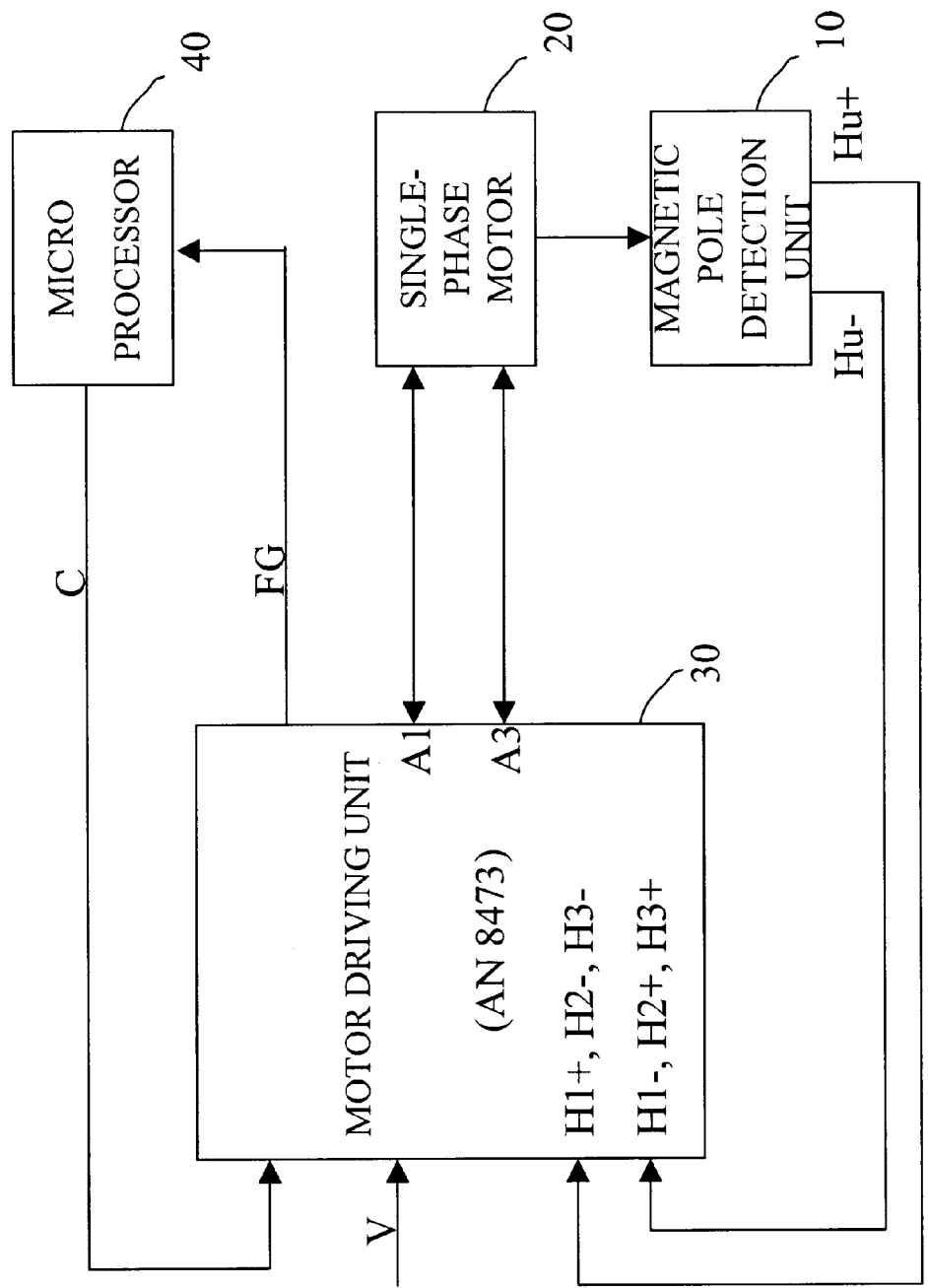
FIG. 1 is a functional block diagram of a first embodiment braking method for a single-phase motor of the invention.

Please refer to FIG. 1 for a first embodiment braking method for a single-phase motor of the invention. A magnetic pole detection unit 10 obtains the rotor magnetic pole positions of the single-phase motor 20, which are denoted as a first positive magnetic pole position signal Hu+ and a first negative magnetic pole position signal Hu−. The magnetic pole detection unit is a magnetic encoder, i.e. a Hall element. The first positive magnetic pole position signal Hu+ connects to the input terminals H1+, H2− and H3− of a motor driving unit 30 (the motor driving unit can be a three-phase motor driving IC or a single-phase motor driving IC, while the current embodiment uses the three-phase motor driving IC, AN8473, made by Matsushita). The first negative magnetic pole position signal Hu− connects to the input terminals H1−, H2+ and H3+ of the motor driving unit 30. The coils on both sides of the single-phase motor 20 connect to the input/output terminals A1 and A3 of the motor driving unit 30, respectively. The motor driving unit 30 then drives the single-phase motor 20 through the input/output terminals A1 and A3 according to the first positive magnetic pole position signal Hu+ and the first negative magnetic pole position signal Hu−, and maintain the rotational speed of the motor at a constant V set of the user. A rotation number signal FG is obtained from, for example, a frequency generator of the single-phase motor rotational axis using the motor driving unit 30. It can also be obtained through a comparer that is input with the first positive magnetic pole position signal Hu+ and the first negative magnetic pole position Hu−. The current embodiment uses the motor driving unit 30 to obtain the rotational number signal FG. The counter of control unit (represented by a microprocessor 40 in the embodiment) counts the rotation number signal FG in order to obtain the rotational speed of the single-phase motor 20. When the rotational speed of the single-phase motor is below a threshold, the microprocessor 40 sends out a control signal C to the motor driving unit 30, which then stops the operation of the single-phase motor 20. At the same time, the microprocessor 40 can also send out a control signal C to a servo unit to stop the operation of the single-phase motor 20.

Figure 2:
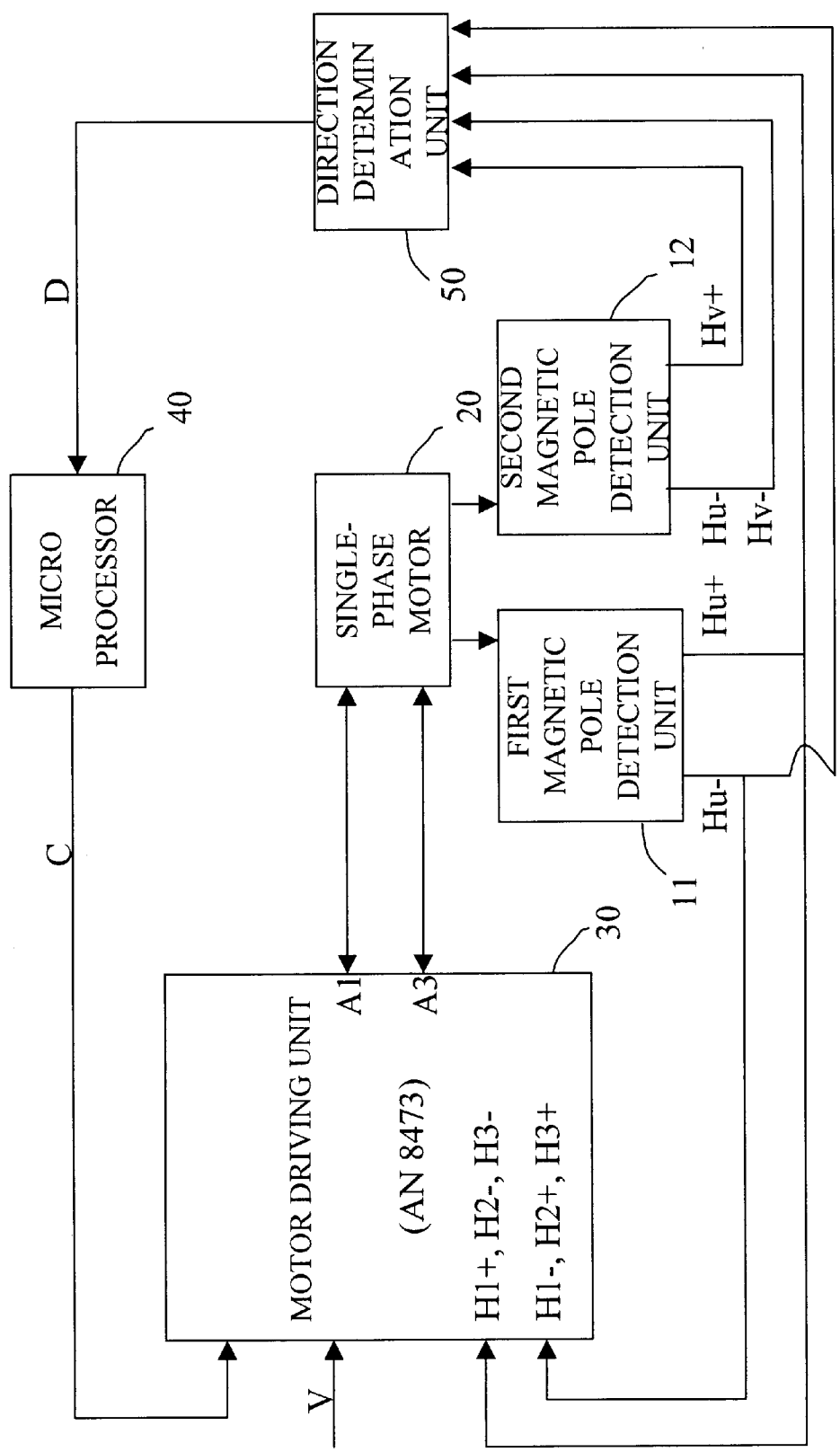
FIG. 2 is a functional block diagram of a first embodiment braking method for a single-phase motor of the invention.
Figure 3:
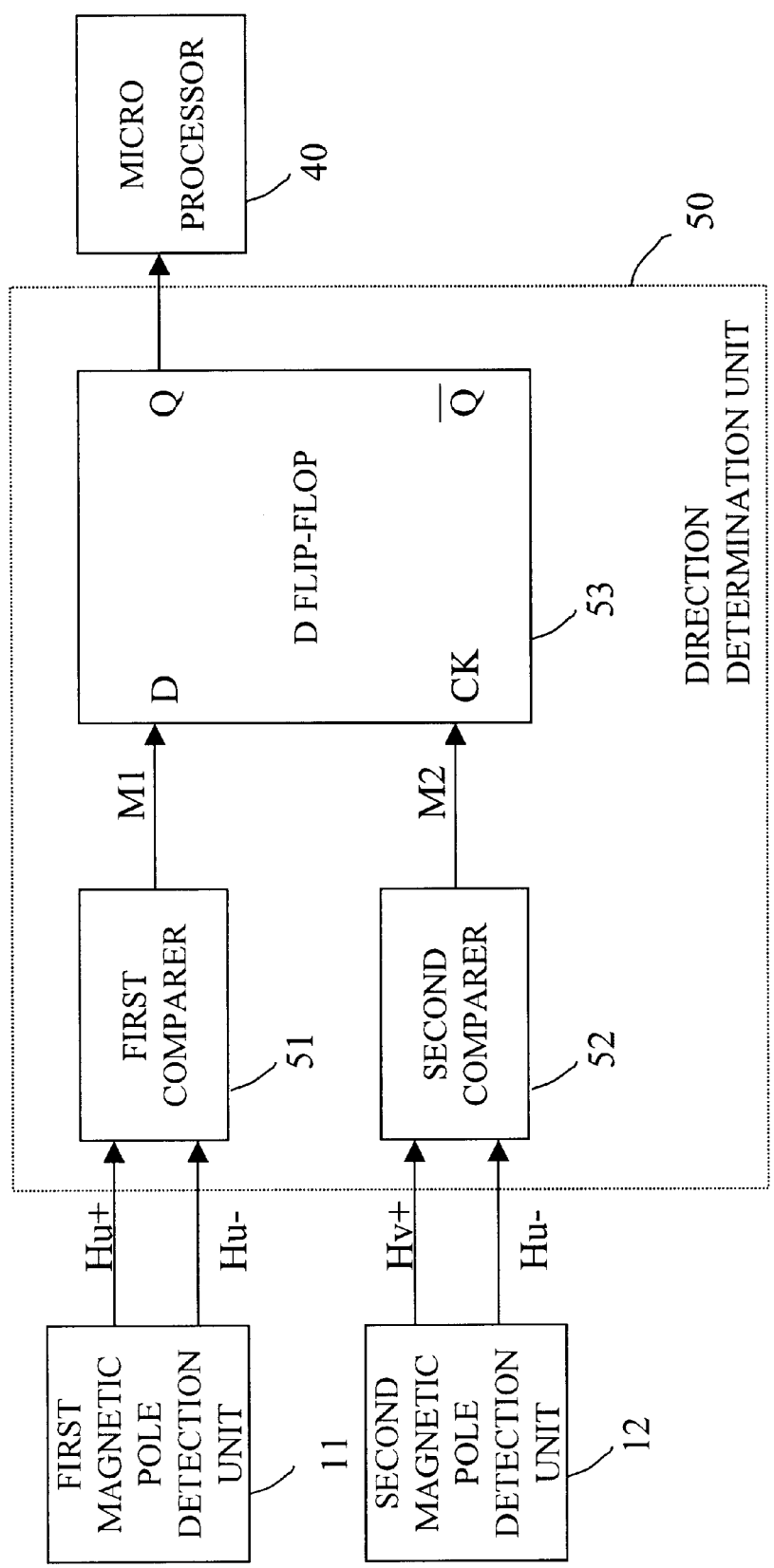
FIG. 3 is a detailed block diagram of a second embodiment braking method for a single-phase motor of the invention.

Please refer to FIG. 2 for a second embodiment of the braking method for a single-phase motor of the invention. First, a first magnetic pole detection unit 11 obtains the magnetic pole positions of a first phase coil (represented by a U phase coil in this embodiment) as a first positive magnetic pole position signal Hu+ and a first negative pole position signal Hu−. A second magnetic pole detection unit 12 obtains the magnetic pole positions of a second phase coil (represented by a V phase coil in this embodiment) as a second positive magnetic pole position signal Hv+ and a second negative pole position signal Hv−. The first magnetic pole detection unit 11 and the second magnetic pole detection unit 12 are magnetic encoders, i.e. Hall elements. The first positive magnetic pole position signal Hu+ connects to the input terminals H1+, H2− and H3− of a motor driving unit 30 (the motor driving unit can be a three-phase motor driving IC or a single-phase motor driving IC, while the current embodiment uses the three-phase motor driving IC, AN8473, made by Matsushita). The first negative magnetic pole position signal Hu− connects to the input terminals H1−, H2+ and H3+ of the motor driving unit 30. The coils on both sides of the single-phase motor 20 connect to the input/output terminals A1 and A3 of the motor driving unit 30, respectively. The motor driving unit 30 then drives the single-phase motor 20 through the input/output terminals A1 and A3 according to the first positive magnetic pole position signal Hu+ and the first negative magnetic pole position signal Hu−, and maintain the rotational speed of the motor at a constant V set of the user. Afterwards, a first comparer 51 with hysteresis in the direction determination unit 50 converts the first positive magnetic pole position signal Hu+ and the first negative pole position signal Hu− into a corresponding first digital magnetic pole signal M1. A second comparer 52 with hysteresis in a direction determination unit 50 converts the second positive magnetic pole position signal Hv+ and the second negative pole position signal Hv− into a corresponding second digital magnetic pole signal M2. A flip-flop (a D flip-flop 53 in the present embodiment) in the direction determination unit 50 determines the rotational direction of the single-phase motor 20 from the first digital magnetic pole signal M1 and the second digital magnetic pole signal M2 and sends out a direction signal D to a control unit (represented by a microprocessor 40 in the present embodiment), as shown in FIG. 3. When the rotational direction of the single-phase motor is forward, the direction signal D has the value 1; whereas when it has an opposite rotational direction, the value of D is 0. Therefore, the microprocessor 40 can determine the rotational direction of the single-phase motor 20 from the value of the direction signal D. When the rotational direction of the single-phase motor 20 is reversed, the microprocessor 40 sends out a control signal C to order the motor driving unit 30 to stop the operation of the single-phase motor 20. The microprocessor 40 can also send out a control signal C to a servo unit, which stops the operation of the single-phase motor 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking method for a single-phase motor, which comprises the steps of:

obtaining a rotor magnetic pole position as a magnetic pole position signal using a magnetic detection unit;

driving and maintaining a rotational speed of the single-phase motor at a speed set by a user with a motor driving unit according to the magnetic pole position signal;

obtaining a rotation number signal;

computing the rotational speed of the single-phase motor with a control unit according to the rotation number signal; and ordering the motor driving unit to stop the operation of the single-phase motor by a control unit when the rotational speed is lower than a threshold.

2. The method according to claim 1 further comprising:

sending a control signal from the control unit to a servo unit when the rotational speed of the single-phase motor is lower than a threshold; and stopping the operation of the single-phase motor using the servo unit.

3. The method according to claim 2, wherein the servo unit is a digital signal processor.

4. The method according to claim 1, wherein the magnetic pole detection unit is a magnetic encoder.

5. The method according to claim 1, wherein the magnetic pole detection unit is a Hall element.

6. The method according to claim 1, wherein the motor driving unit is a three-phase motor driver.

7. The method according to claim 1, wherein the motor driving unit is a single-phase motor driver.

8. The method according to claim 1, wherein the control unit is a microprocessor.

9. A braking method for a single-phase motor, which comprises the steps of:

obtaining a magnetic pole position of a first phase coil as a first magnetic position signal using a first magnetic detection unit;

obtaining a magnetic pole position of a second phase coil as a second magnetic position signal using a second magnetic detection unit;

driving and maintaining a rotational speed of the single-phase motor at a speed set by a user using a motor driving unit according to the first magnetic pole position signal;

determining a rotational direction of the single-phase motor using a direction determination unit according to the first magnetic pole position signal and the second magnetic pole position signal; and ordering the motor driving unit to stop the operation of the single-phase motor by a control unit when the single-phase motor rotates in a reverse direction.

10. The method according to claim 9 further comprising:

sending a control signal from the control unit to a servo unit when the rotational speed of the single-phase motor is lower than a threshold; and stopping the operation of the single-phase motor using the servo unit.

11. The method according to claim 10, wherein the servo unit is a digital signal processor.

12. The method according to claim 9, wherein the magnetic pole detection unit is a magnetic encoder.

13. The method according to claim 9, wherein the magnetic pole detection unit is a Hall element.

14. The method according to claim 9, wherein the first phase coil is a U-phase coil.

15. The method according to claim 9, wherein the second phase coil is a V-phase coil.

16. The method according to claim 9, wherein the motor driving unit is a three-phase motor driver.

17. The method according to claim 9, wherein direction determination unit comprises:

a first comparer, which converts the first magnetic pole position signal into a corresponding first digital magnetic pole signal;

a second comparer, which converts the second magnetic pole position signal into a corresponding second digital magnetic pole signal; and a flip-flop, which determines the rotational direction of the single-phase motor according to a first digital magnetic pole signal and a second digital magnetic pole signal.

18. The method according to claim 17, wherein the flip-flop is a D flip-flop.

19. The method according to claim 9, wherein the control unit is a microprocessor.

* * * * *